United States Patent
Scott-Collins et al.

(10) Patent No.: US 11,142,127 B2
(45) Date of Patent: Oct. 12, 2021

(54) PIVOT JOINT SYSTEM AND REAR VIEW DEVICE THEREWITH

(71) Applicant: SMR Patents S.à.r.l., Luxembourg (LU)

(72) Inventors: Callum Scott-Collins, Portchester (GB); Andrew Lettis, Portchester (GB)

(73) Assignee: SMR Patents S.à.r.l., Luxembourg (LU)

( * ) Notice: Subject to any disclaimer, the term of this patent is extended or adjusted under 35 U.S.C. 154(b) by 90 days.

(21) Appl. No.: 16/615,988

(22) PCT Filed: May 24, 2018

(86) PCT No.: PCT/EP2018/063665
§ 371 (c)(1),
(2) Date: Nov. 22, 2019

(87) PCT Pub. No.: WO2018/215599
PCT Pub. Date: Nov. 29, 2018

(65) Prior Publication Data
US 2020/0331391 A1 Oct. 22, 2020

(30) Foreign Application Priority Data
May 24, 2017 (DE) .................. 10 2017 111 460.2

(51) Int. Cl.
 *B60R 1/076* (2006.01)
 *F16C 11/12* (2006.01)
 *B62D 27/04* (2006.01)

(52) U.S. Cl.
 CPC ............. *B60R 1/076* (2013.01); *F16C 11/12* (2013.01); *B62D 27/04* (2013.01)

(58) Field of Classification Search
 CPC .......................................... B60R 1/076
 (Continued)

(56) References Cited

U.S. PATENT DOCUMENTS 5,081,546 A * 1/1992 Bottrill ................ B60R 1/0617
 248/478
5,364,058 A 11/1994 Shepherd
(Continued)

FOREIGN PATENT DOCUMENTS

CN 2335832 Y 9/1999
EP 0345756 A1 12/1989
(Continued)

OTHER PUBLICATIONS

International Search Report dated Aug. 7, 2018 of International application No. PCT/EP2018/063665.
(Continued)

*Primary Examiner* — Ricky D Shafer
(74) *Attorney, Agent, or Firm* — Jones Day (57) ABSTRACT

A pivot joint system of a rear view device includes a base to be fixed to a vehicle and a head rotatable relative to the base, the pivot joint system acting between two components that rotate with respect to one another around an axis to control rotation from a first set position to at least one second set position, with each of the two components including a cylindrical section and a resilient means being arranged within a cylindrical space between said cylindrical sections to act between the two components.

16 Claims, 10 Drawing Sheets

(58) Field of Classification Search
USPC .......................................... 359/841, 872, 877
See application file for complete search history.

(56) References Cited

U.S. PATENT DOCUMENTS

| | | | |
|---|---|---|---|
| 5,684,646 A * | 11/1997 | Boddy | B60R 1/074 |
| | | | 359/841 |
| 5,844,733 A * | 12/1998 | Ravanini | B60R 1/06 |
| | | | 359/872 |
| 5,867,328 A * | 2/1999 | Stapp | B60R 1/074 |
| | | | 359/841 |
| 6,130,514 A * | 10/2000 | Oesterholt | B60R 1/074 |
| | | | 248/479 |
| 6,322,221 B1 * | 11/2001 | van de Loo | B60R 1/074 |
| | | | 359/841 |
| 6,371,619 B1 * | 4/2002 | Assinder | B60R 1/06 |
| | | | 359/841 |
| 7,008,067 B2 * | 3/2006 | Hsu | B60R 1/074 |
| | | | 248/466 |
| 7,165,852 B2 * | 1/2007 | Pavao | B60R 1/06 |
| | | | 248/479 |
| 8,998,431 B2 * | 4/2015 | Tseng | B60R 1/076 |
| | | | 359/877 |
| 10,166,925 B2 * | 1/2019 | Wieczorek | B60R 21/34 |
| 2009/0147388 A1 * | 6/2009 | Mendoza | B60R 1/076 |
| | | | 359/871 |
| 2014/0268379 A1 | 9/2014 | Kelly | |
| 2017/0297492 A1 * | 10/2017 | Yoshida | B60R 1/076 |

FOREIGN PATENT DOCUMENTS

| | | |
|---|---|---|
| FR | 1237231 A | 7/1960 |
| GB | 854884 A | 11/1960 |
| JP | S5965189 A | 4/1984 |

OTHER PUBLICATIONS

Written Opinion dated Aug. 7, 2018 of International application No. PCT/EP2018/063665.

* cited by examiner

PIVOT JOINT SYSTEM AND REAR VIEW DEVICE THEREWITH

CROSS-REFERENCE TO RELATED APPLICATIONS

This application is a National Stage Entry of International Patent Application No. PCT/EP2018/063665, filed Nov. 24, 2018, which claims the benefit of German Patent Application No. DE 10 2017 111 460.2, filed May 24, 2017, each of which is hereby incorporated by reference in its entirety for all purposes.

BACKGROUND

1. Field of the Invention

The present disclosure relates to a pivot joint system of a rear view device. It also relates to a rear view device with a base to be fixed to a vehicle, a head rotatable relative to the base and said pivot joint system.

2. Related Art

US 2014/0268379 A1 refers to a method of moving a mirror, said method comprising the steps of providing an arm which supports a mirror at one end thereof; enabling said arm to move along a first axis or about a second axis at another end thereof, wherein said arm a) rotates about said axis in a first rotational direction or b) moves along said second axis in a first linear; and providing force to urge said arm a) about said first axis in a second rotational direction opposite to said first rotational direction, or b) along said second axis in a second linear direction opposite to said first linear direction.

A spring-loaded bracket according to U.S. Pat. No. 5,364,058 A includes a first part securable to a support, a second part mounted on the first part for angular movement relative thereto in opposite directions from a neutral position and a spring assembly biasing the second part to the neutral position. The spring assembly has a helical torsion spring carried by the first part and having first and second end portions at opposite ends. A first stop is carried by the first part to limit movement of the first spring end portion in a spring unwinding direction, and a second stop is carried by the first part to limit movement of the second spring end portion in a spring unwinding direction. Said second part has a first abutment engaging the first spring end portion so as to deflect the first spring end portion in a spring winding direction when the second part in moved angularly relative to the first part in one direction from the neutral position, and the second part has a second abutment engaging the second spring end portion so as to deflect the second spring end portion in a spring winding direction when the second part is moved angularly relative to the first part in the opposite direction from the neutral position.

CN 2 335 832 Y discloses a supporting base of a rear-view mirror for a vehicle, which comprises a casing, a mother disc, a son disc, a supporting rod, a torsion spring and a spring; the mother disc is engaged with the son disc, the other end of the mother disc is connected with a main body, the other end of the son disc is matched with the thread of the supporting rod, the other end of the supporting rod is connected with the rear-view mirror, the both ends of the torsion spring are respectively connected with the son disc and the supporting rod, and the spring is positioned between the casing and the mother disc.

A remote controlled rearview mirror assembly is disclosed in EP 0 345 756 A2. A mirror body is foldably mounted on a shaft, foldable forwardly or rearwardly; a mirror is tiltably mounted on a pivot in the mirror body; and a mirror angle control lever with a ball joint provided on the shaft is mounted on the back side of the mirror via a mirror operation arm. The ball joint consists of a pair of semi-spherical members being vertically separable with a clutch provided between opposed surfaces of these members. When the mirror body is folded forwardly or rearwardly from its neutral position, the ball joint is separated into the upper and lower semi-spherical members by the clutch between the opposed surfaces of the members, so that the connection between the control lever and mirror operation arm is released. When the mirror body is returned to the neutral position, the clutch is engaged again to restore the connection between the control lever and mirror operation lever.

EP 0 711 682 A1 describes such a pivot joint system. The known system acts between two components that rotate with respect to one another to control rotation from a first set position to at least a second set position that comprises at least one rotating cam positioned between adjacent surfaces of said two components and spaced from the axis of rotation of said two components, said cam being journalled for rotation on one of said components about an axis that is substantially transverse to the axis of rotation between said two components, the operating surface of said cam comprising at least one ca m lobe that is caused to rotate as said two components rotate and acts to separate said components, and resilient means acting between said two components to urge said adjacent surfaces together and one of said adjacent surfaces against said cam so that a predetermined torque is required to cause relative rotation between said components, said predetermined torque being set by the force applied by said resilient means resulting from the extent of compression of said resilient means when said two components separate upon rotation. Upon relative rotation between the two components, the cam is caused to rotate and the upward path of a lobe causes the two components to be separated as the lobe is brought between the adjacent component and the axis of rotation of the cam.

Generally the head of a rear view device can be rotated between a driving position and a parking position. When an impact is applied to the rear view device the head can be forced into a knocked out position from which it is not automatically returning to the driving position. Manually forcing the head back from the knocked out position into in particular the driving position is time consuming and might cause damage of the rear view device.

SUMMARY

In an aspect, a pivot joint system of a rear view device includes a base to be fixed to a vehicle and a head rotatable relative to the base, the pivot joint system acting between two components that rotate with respect to one another around an axis to control rotation from a first set position to at least one second set position, with each of said two components comprising a cylindrical section and a resilient means being arranged within a cylindrical space between said cylindrical sections to act between said two components, wherein the first component is part of or fixedly connected to the head and the second component is part of or fixedly connected to the base, and the resilient means comprises a torsion spring arranged concentrically around the pivot axis. This pivot joint system may further include detent means for securing the first set position of the first component relative to the second component until a predetermined torsional load is applied rotating the first component relative the second component, wherein the torsion spring has a first tail at a first end, which is attached to the first component, and a second tail at the second end, which is attached to the second component, such that a torsional load applied into the spring when rotating the first component out of the first set position relative to the second component into the at least one second set position relative to the second component forces the first component back into the first set position relative to the second component, with the first set position being defined by the driving position of the head and the at least one second set position comprising the knocked out position of the head, and detent means for securing the detent means lifts the first component relative to the second component when rotating in the at least one second set position resulting in a compression of the spring such that relaxation of the spring assists in forcing the first component back into the first set position relative to the second component. In addition, the pivot joint system may be provided with a bolt that has a longitudinal axis falling together with the pivot axis, where the bolt provides a support extension for a first end of the spring, and the second end of the spring abuts against a shoulder of the second component cylindrical section. In an example, the first component cylindrical section may be provided with a step against which the second component cylindrical section is forced by the spring. In another example, the pivot joint system further includes a washer that is arranged between the support extension and the spring as well as the first component cylindrical section, with the first component cylindrical section being concentrically arranged around the bolt, the spring being concentrically arranged around the first component cylindrical section, and the second component cylindrical section being concentrically arranged around the spring.

The two components that rotate with respect to one another are comprised by the pivot joint system, with the first component preferably being a case frame of the head of the rear view device or a part fixedly connected to a case frame, and the second component preferably being a base frame of the base of the rear view device.

The first component cylindrical section may fit at least partly into a cylindrical opening of the second component cylindrical section.

In one embodiment a spacer can be arranged concentrically around the first component cylindrical section, in particular below the spring, and/or the second component cylindrical section can have its longitudinal axis shifted relative to the pivot axis.

In another embodiment the first component comprises the case frame and a bayonet means, in particular a bayonet tower.

It is preferred that one or more, preferably three, detents of the case frame, preferably extending from the cylindrical section of the case frame, are arranged concentrically around the cylindrical section of the bayonet means and/or concentrically within the cylindrical section of the case frame, in particular between detent means of the case frame and/or above the spring.

It is proposed that a recess is provided in each of one or more, preferably three, detents of the detent means of the base frame for engaging with a locking projection of the detent means of the bayonet means, preferably projecting from the cylindrical section of the bayonet tower.

Still further, it is proposed that the spring is suited to be compressed between an extension or rim of the bayonet means and a shoulder or rim of the base frame, in particular provided by the detent means of the base frame.

Further it is proposed that the tails of the spring are attached via locking means to the first component cylindrical section and the second component cylindrical section, respectively.

The locking means can be rotational displaced relative to each other. A first locking means can extend between the first component cylindrical section and the spacer, and the second locking means can extend between the spacer and the second component cylindrical section. The first locking means can ensure a locking of a first tail of the spring internal into the first component cylindrical section, and the second locking means can ensure a locking of the second tail of the spring external to the second component cylindrical section.

The washer can be attached to the first component cylindrical section and/or the first end of the spring.

It is preferred that the detent means extends into a recess of the first component cylindrical section with the recess preferably being defined within a cylindrical extension of the first component cylindrical section.

The detent means can provide at least one detent acting on an inner surface of the cylindrical extension, and/or a guide face in form of a flat or inclined guide ramp along which the cylindrical extension can travel during rotation of the first component relative to the second component, the recess in particular having a shape complementary to the guide ramp, and/or at least one further detent forming a stop against which the cylindrical extension is abutting to define a second set position, and/or a top, in particular provided by the stop, to abut against the recess.

It is also proposed that at least two head movement stops are provided by the case frame, preferably between two detents of the detent means.

Sealing means, comprising at least one seal element, can be provided between the case frame and the base frame, preferably clipped to the case frame.

In another aspect, a rear view device includes a base to be fixed to a vehicle, a head rotatable relative to the base and a pivot joint system of one of the preceding claims, where the first component is part of or fixedly connected to the head, in particular in form of a case frame or a part fixedly connected to a case frame, like a bayonet tower, and the second component is part of or fixedly connected to base, in particular in form of a base frame, and wherein the first set position is defined by the driving position of the head, and the second set position comprises the knocked out position of the head.

It is preferred that the head comprises at least one reflective element and/or camera, preferably attached to the case frame, in particular via an articulation system.

Finally it is proposed that each detent of the detent means of the case frame is provided with a lip at least along a part of its outer perimeter for a smooth interface with a motor cradle of the articulation system.

The pivot joint system may be suited for an external rear view device having a head which can be moved relative to a fixed base, as for example described in EP 3321132 A1. The moveable head can comprise one or more reflective elements and/or one or more cameras. Following head impact or displacement, forwards and rearwards, the head is displaced from the customer home position, which can be the driving position defined by a drive condition. According to the invention no physical or electrical reset is required to re-establish the home position due to a special spring mechanism created to provide torsional and, if applicable, also compressive forces to automatically return the head to the drive condition. Thus, the pivot joint system of the invention is self-aligning as it returns the head back to the drive condition following impact displacement.

The spring mechanism uses a spring with two tails, one at each end, to lock into the base frame and case frame components separately. Locking the spring into both components allows the spring to act under torsion when the head is broken out. It is the action of applying torsional load into the spring that forces the head back to drive condition. In addition, a compression of the spring applied when lifting the case frame component via a detent means is encouraging the self-return function of the head in conjunction with the torsional load applied.

In addition, many of the described components may be manufactured from polymeric materials. As such, its manufacture is simple and inexpensive.

BRIEF DESCRIPTION OF THE DRAWINGS

The invention may be best understood with reference to the following description of embodiments taken together with the accompanying schematic drawings:

FIG. 1b is a section view along line A-A of FIG. a;

DETAILED DESCRIPTION

A pivot joint system of the invention is suited for a rear view device, namely between a base to be fixed at a vehicle and a head or case which can be moved relative to the base. Such a rear view device is e.g. described in EP 3321132 A1. In the following two embodiments of the pivot joint system are described with respect to FIGS. 1a to 2d, while FIG. 3 shows a rear view device of the invention with one of said joint systems, illustrating a drive condition of the head 60 as well as a knocked forward or fold condition of the head 60' relative to a base 50. The shown fold condition is at a first predefined angle outboard from the drive condition and there might be, in addition, a not shown park condition at a second predefined angle inboard from the drive condition. The fold condition is achieved manually and, thus, without influence of a not shown actuator device. The head carries at least one not shown reflective element and/or camera.

Figure 1A:
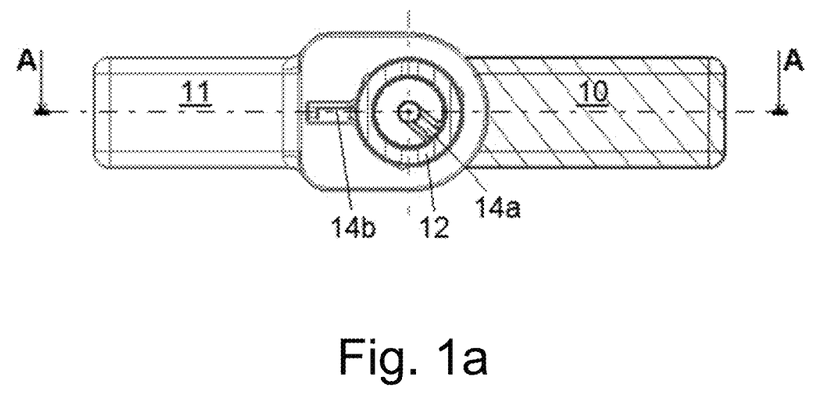
FIG. 1a is a bottom view of a first pivot joint system of the invention between a head and a base of a rear view device.
Figure 1B:
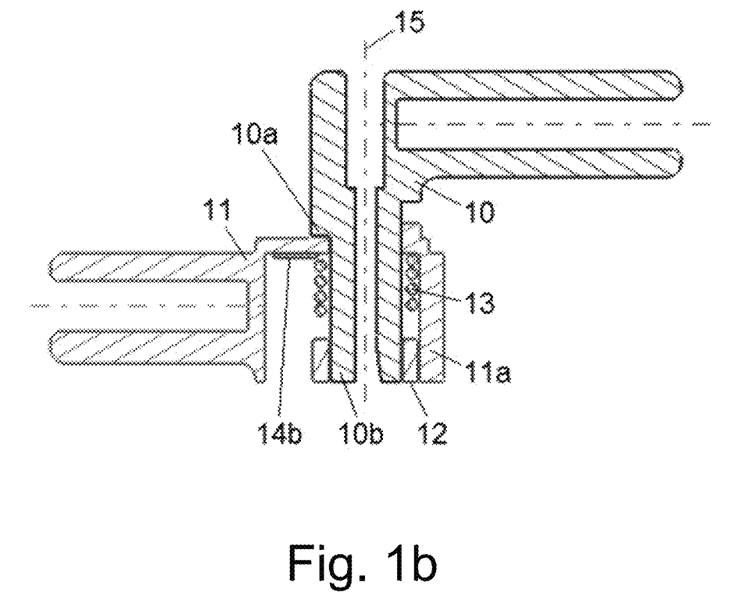

In a first embodiment of the invention shown in FIGS. 1a and 1b, the pivot joint system comprises a case frame 10 belonging to or being provided by the head 60 of a rear view device, a base frame 11 belonging to or being provided by the base 50 of the rear view device, a spacer 12 between the case frame 10 and the base frame 11, and a torsion spring 13 attached via a first locking means 14a to the case frame 10 and via a second locking means 14b to the base frame 11. In other words, the torsion spring 13 is provided with two tails for the two locking means 14a, 14b.

The case frame 10 is provided with a step 10a against which a cylindrical section 11a of the base frame 11 acting as a spring case is resting. Below the step 10a the case frame 10 is provided with a cylindrical section 10b being arranged concentrically around a pivot axis 15. The spring 13 is arranged around at lease a part of the cylindrical section 10b. The spring case cylindrical section 11a is spaced from the cylindrical section 10b by the spacer 12 leaving a mounting space for the spring 13.

The longitudinal axis of the spring case cylindrical section 11a is shifted parallel to the axis 15 such that it abuts on the spacer 12 in a first section and leaves space for the second locking means 14b in a second section. The second locking means 14b is rotated relative to the first locking means 14a around the axis 15. Further, the first locking means 14a extends between the case frame 10 and the spacer 12, and the second locking 14b extends between the spacer 12 and the base frame 11, both in a horizontal plane. Still further, the first locking means 14a ensures a locking of a first tail of the spring 13 internal into the case frame 10, whereas the second locking means 14b ensures a locking of the second tail of the spring 13 external to the base frame 11.

The torsion spring 13 is preloaded in a normal position of the head 60 relative to the base 50, with said normal position being shown in FIGS. 1a and 1b. As the torsion spring 13 is locked to both components, namely the case frame 10 and the base frame 11, it is allowed to act under torsion when the head 60 is broken out into the fold condition. It is the action of applying torsional load into the spring 13 that forces the head 60' back to the drive condition after having been broken outboard. Thus, the joint system of the invention provides a simple structure for automatically returning the head 60' from a fold condition back to a drive condition.

In a second embodiment of the invention shown in FIGS. 2a to 2d, the pivot joint system comprises a case frame 20 with a step 20a, a base frame 21 with a shoulder 21a and a torsion spring 23. The torsion spring 23 functions in principal in analogy to the torsion spring 13 of the first embodiment to return the head 60' from the fold condition to the drive condition shown in FIG. 2b from the top.

Figure 2A:
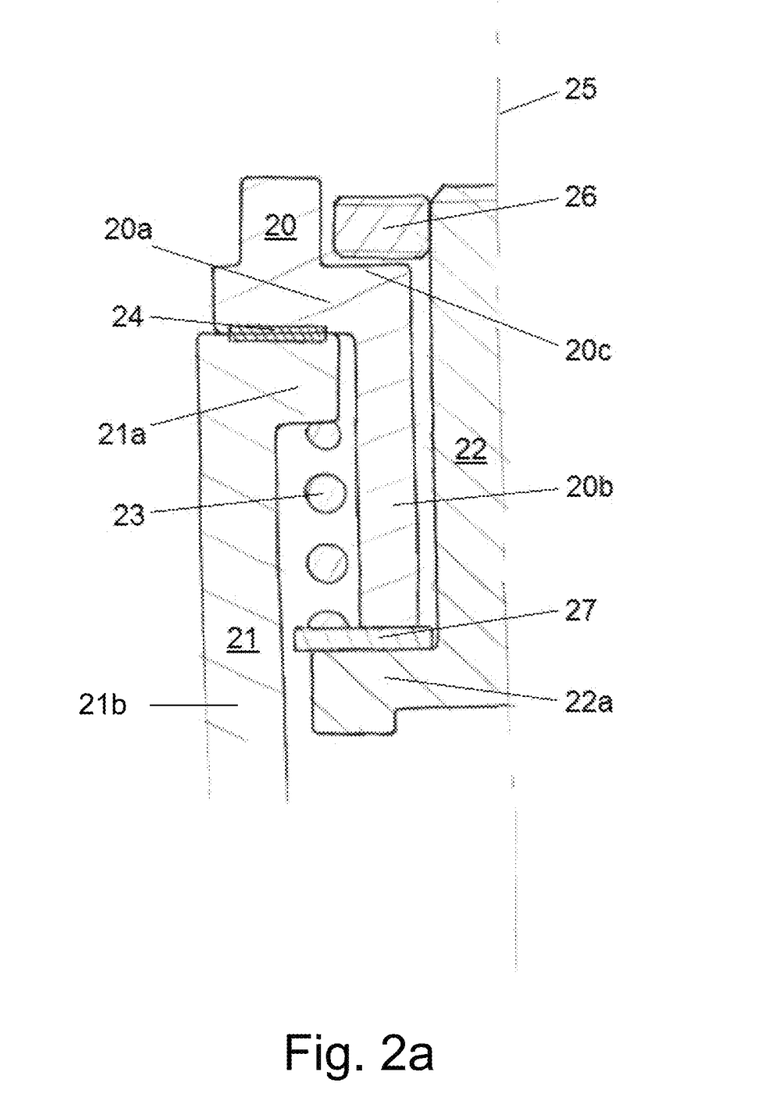
FIG. 2a is a part section view of a second pivot joint system of the invention.
Figure 2B:
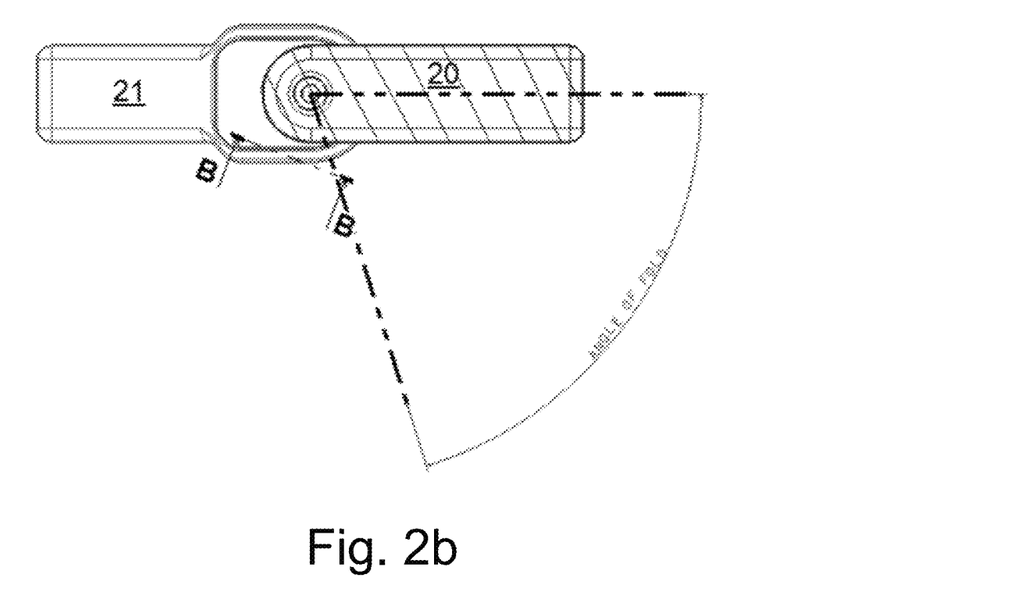
FIG. 2b is a top view of the second pivot joint system.
Figure 3:
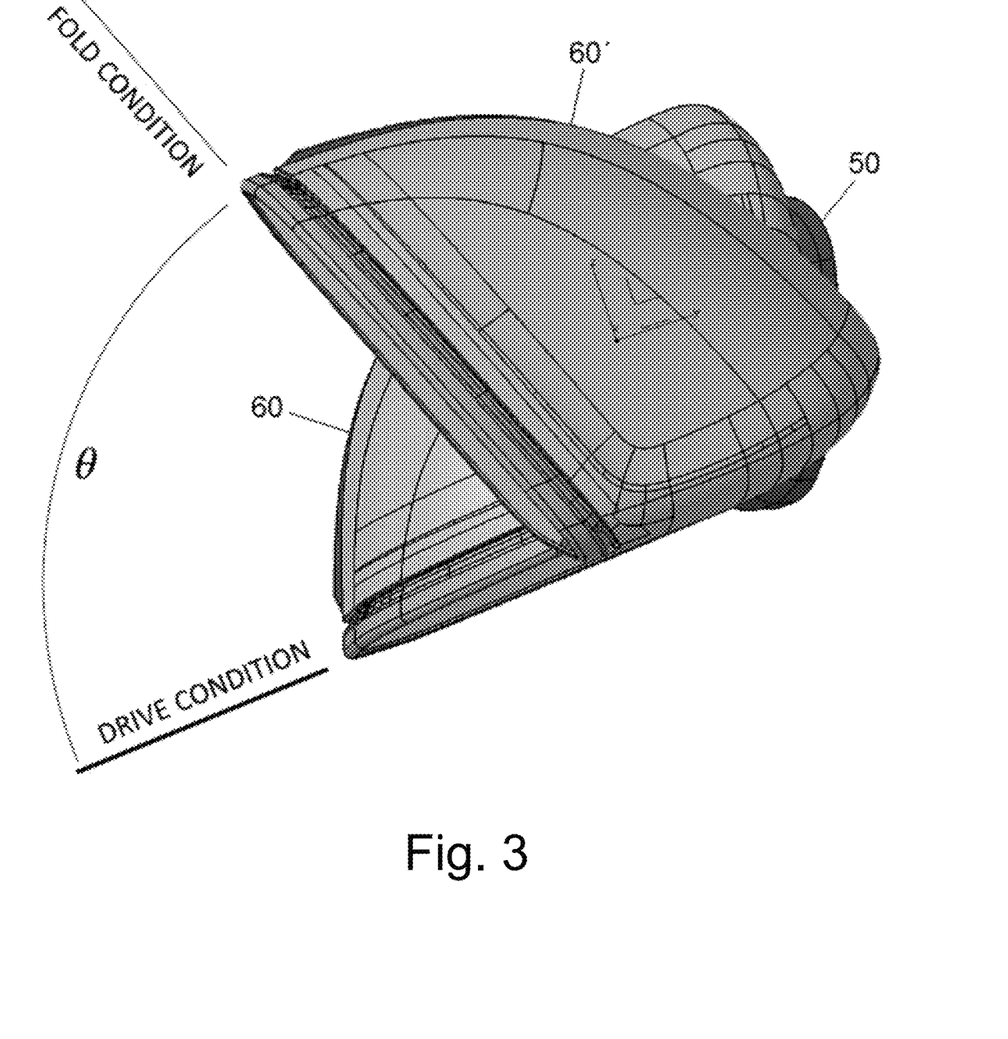
FIG. 3 is a perspective view of a rear view device of the invention, in the drive condition and the fold condition.

In addition FIG. 2a shows a bolt 22 arranged in the center, through which the pivot axis 25 extends. The bolt 22 is providing a support extension 22a for the lower end of the spring 23, the upper end of which abuts against the shoulder 21a of the base frame 21. A washer 27 is arranged between the support extension 22a, on the one side, and the spring 23 as well as a cylindrical section 20b of the case frame 20 provided below the step 20a, on the other side. The cylindrical section 20*b* is concentrically arranged around the bolt 22, the spring 23 is concentrically arranged around the cylindrical section 20*b*, and the base frame 21 is concentrically arranged around the spring 23. The washer 27 is attached to the cylindrical section 20*b* such that a lift or upward movement of the case fame 20*a* will lead to a compression of the spring 23. The washer 27 is also attached to the lower tail of the spring 23 to ensure the self return function of the spring 23 after applying a torsional force.

A nut 26 is screwed on the upper end of the bolt 22 to secure the pivot joint system and is arranged within a shoulder 20*c* of the case frame 20.

A detent engagement secures the drive condition and comprises a detent means 24 between the shoulder 21*a* of the base frame 21 and the step 20*a* of the case frame 20. The detent engagement can be broken when folding the head by applying a predetermine torque. The detent means 24 will be explained with respect to FIGS. 2*c* and 2*c* in detail.

Figure 2C:
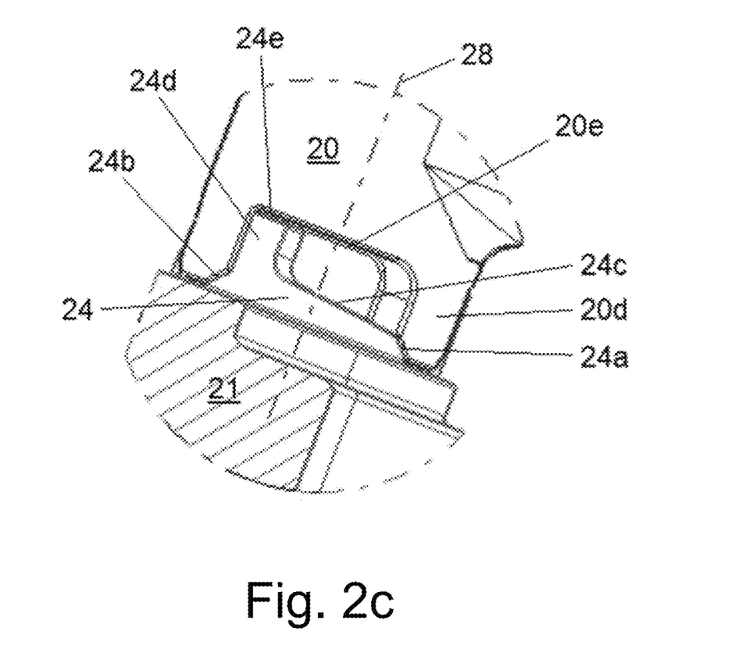
FIG. 2c is a section view along line B-B of FIG. 2b.
Figure 2D:
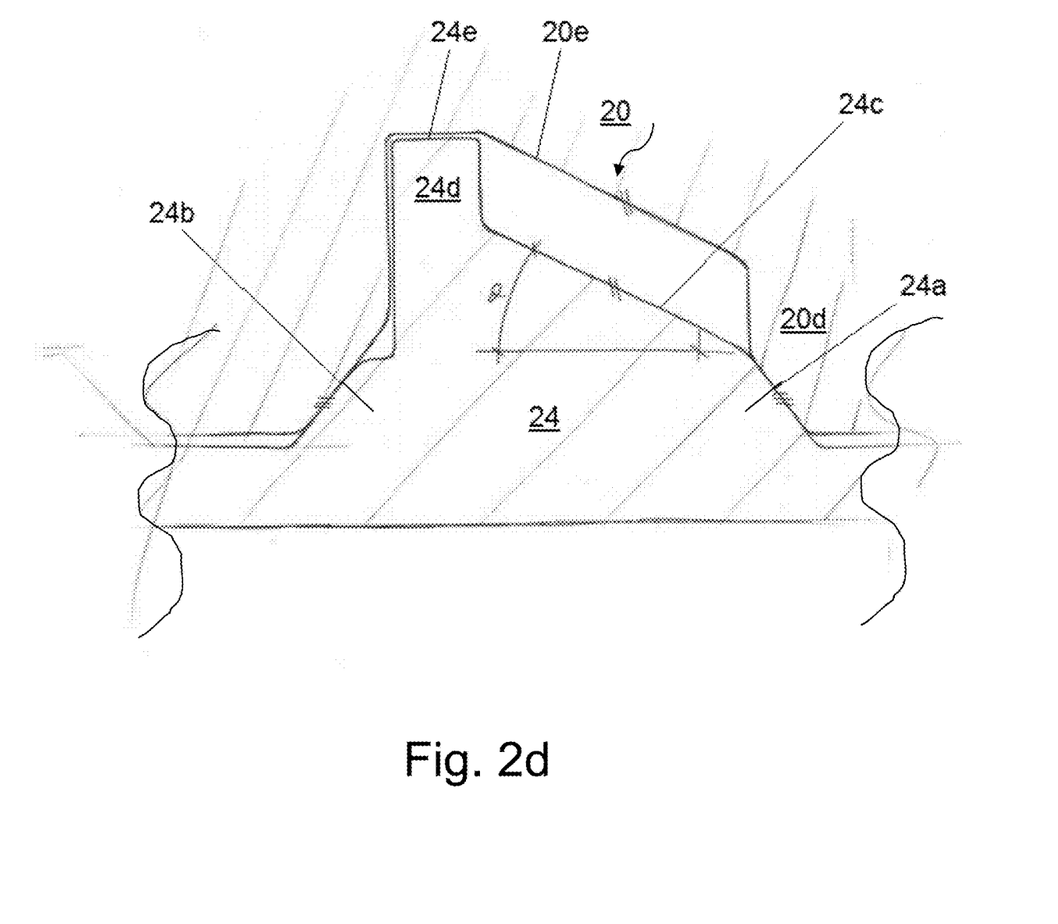
FIG. 2d is an enlarged section view of the second pivot joint system.

FIGS. 2*c* and 2*d* show details of the detent means 24 which is attached to the base frame 21 and extends into a recess 20*e* of the case frame 20, leaving a cylindrical extension 20*d* embracing the detent means 24. The detent means 24 provides two detents 24*a*, 24*b* acting on inner surfaces of the cylindrical extension 20*d*,
a guide ramp 24*c* along which the cylindrical extension 20*d* can travel,
a third detent forming a stop 24*d* against which the cylindrical extension 20*d* is abutting at the end of the guide ramp 24, and
a top 24*e* provided by the stop 24*d* to abut against the recess 20*e*, with the recess 20*e* following the contour of the guide ramp 24*c*.

In case the head 60 is knocked out from its drive condition into the fold condition the case frame cylindrical extension 20*d* is forced to move along the guide ramp 24*c* to the stop 24*d*. During this movement of the cylindrical extension 20*d* along the guide ramp 24*c* the case frame 20 is lifted and, thus, the spring 23 is compressed. The relaxation of the compressed spring 23 encourages the self-return function of the pivot joint system of the invention in conjunction with the torsional load applied when knocking out the head 60 from its drive condition to the fold condition.

Figure 4:
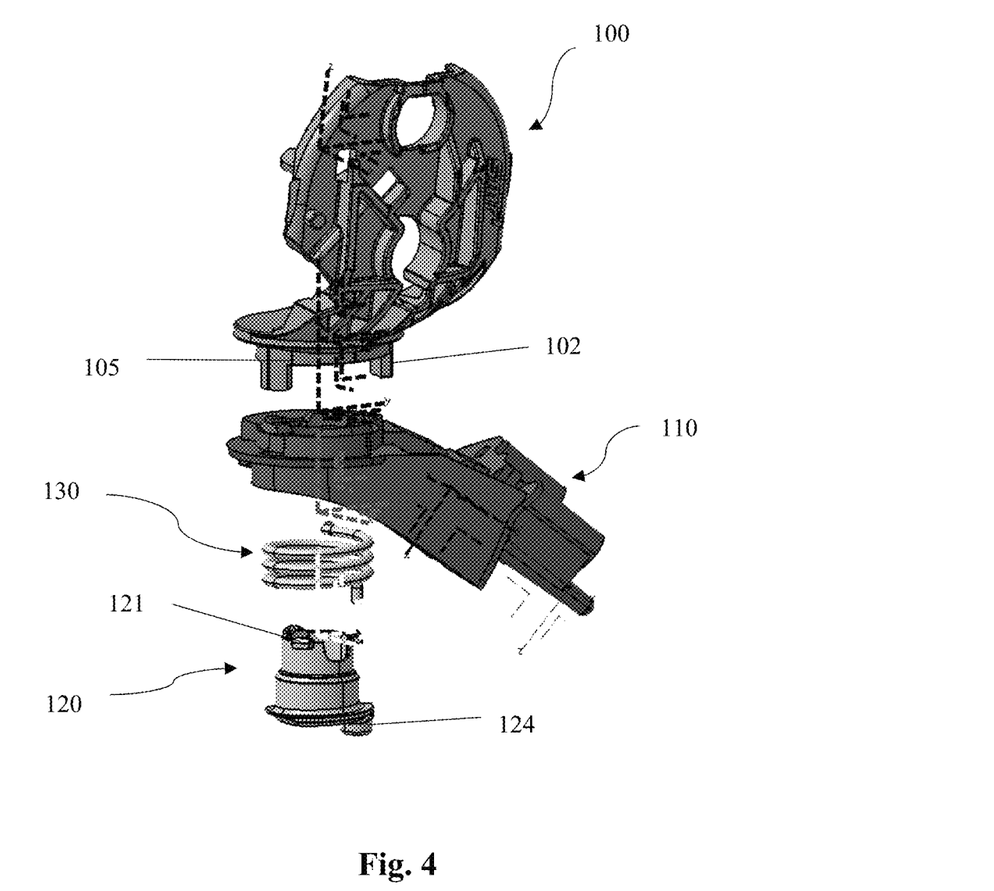
FIG. 4 is an explosion view of a third pivot joint system of the invention between a head and a base of a rear view device.

In a third embodiment of the invention shown in FIGS. 4 to 9, the pivot joint system comprises a case frame 100, a base frame 110, a bayonet tower 120 and spring 130 as best seen in FIG. 4.

Figure 5:
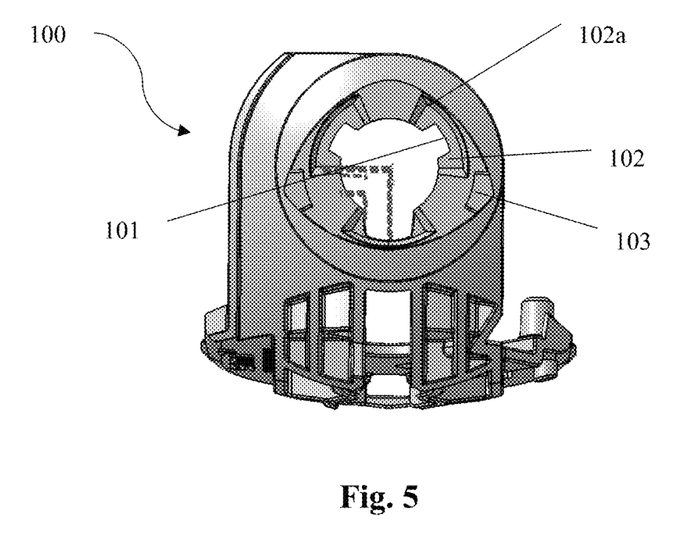
FIG. 5 is a bottom view of a case frame of the pivot joint system of FIG. 4.

The case frame 100 is shown in more detail in FIG. 5 and is provided with three detents 102 each formed with a recess or step 101 at its inner side and a lip 102*a* around its outer periphery. The lips 102*a* ensure an interface with a not shown motor cradle of an articulation system, which is suited for moving a not shown reflective element and is attached to the base frame 100 in the assembled rear view device. Still further, the case frame 100 is provided with two head movement stop elements 103.

Figure 6:
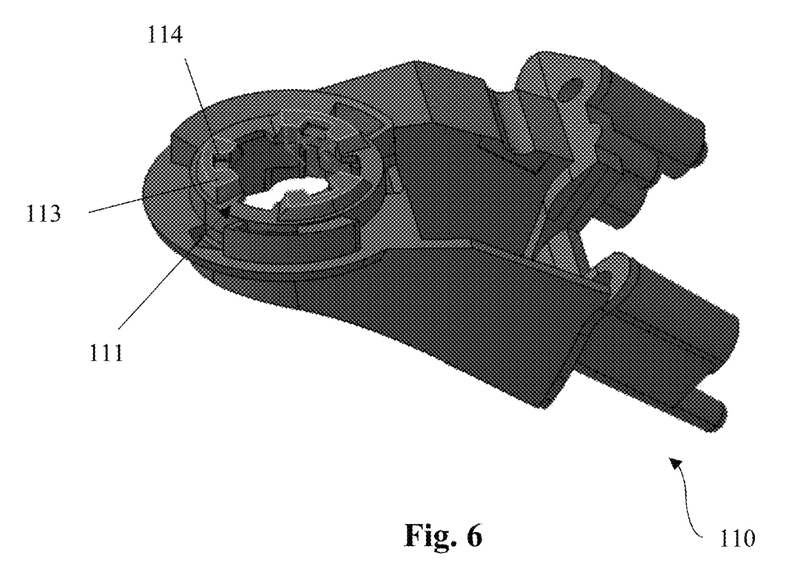
FIG. 6 is a perspective top view of a base frame of the pivot joint system of FIG. 4.

FIG. 6 shows further details of the base frame 110 in form of a cylindrical section 111 from which three detents 113 extend, with each detent 113 being provided with a recess 114.

Figure 7A:
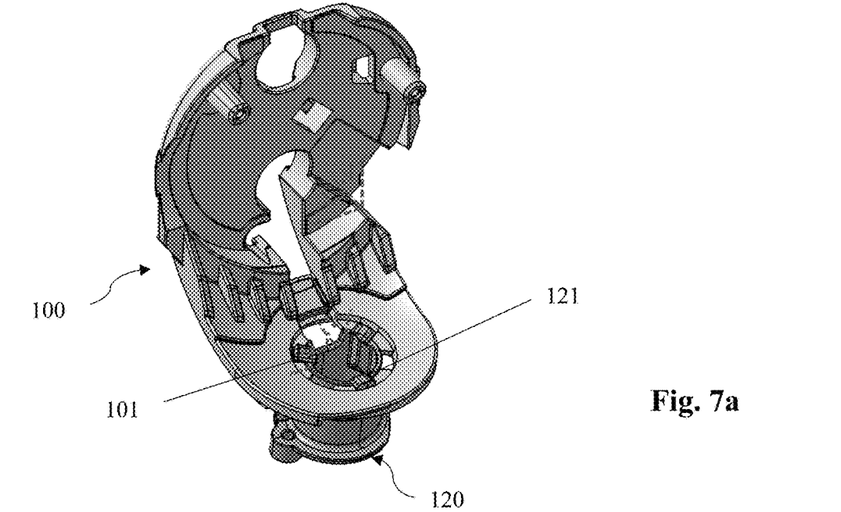
FIG. 7a is a perspective top view of the case frame attached to a bayonet tower of the pivot joint system of FIG. 4.

FIG. 7*a* shows a sub assembly provided by the case frame 100 and the bayonet tower 120. In fact, those two parts are fixedly secured to each other by locking projections 121 of the bayonet tower 120 engaging the recesses or steps 101 of the case frame 100. This locks the bayonet tower 120 and the case frame 100 together with the compressional force of the spring 130 as soon as the spring 130 is attached to the bayonet tower 120 as described with respect to FIGS. 8*a* and 8*b*.

Figure 7B:
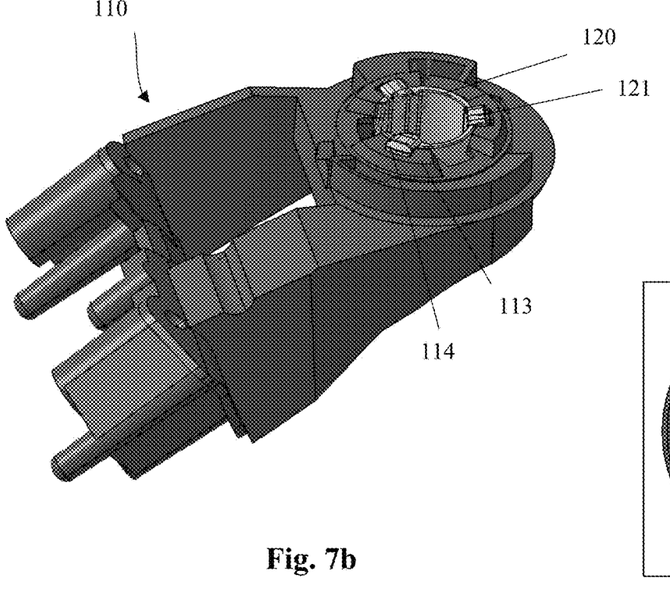
FIG. 7b is a perspective top view of the base frame attached to the bayonet tower of the pivot joint system of FIG. 4.

FIG. 7*b* shows a sub assembly of the base frame 110 and the bayonet tower 120. The locking projection 121 of the bayonet tower 120 engage the recesses 114 of the detents 113. This sub assembly is existent before the bayonet tower 120 is finally located into the case frame 100 as explained with respect to FIG. 7*a*, with the interim position initially loading the spring 130 in compression and in torsion prior to the final assembly to the case frame 100.

Figure 7C:
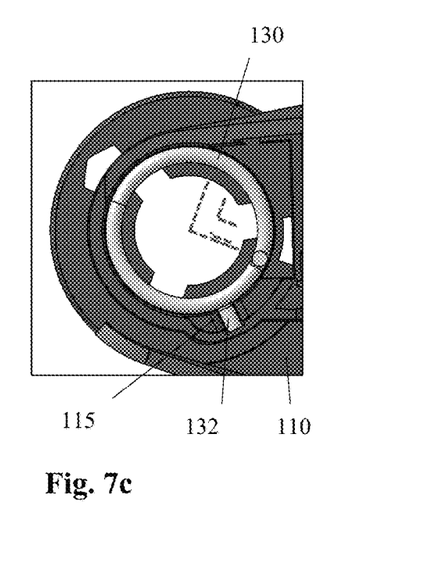
FIG. 7c is a top view of the base frame with a spring of the pivot joint system of FIG. 4.
Figure 8A:
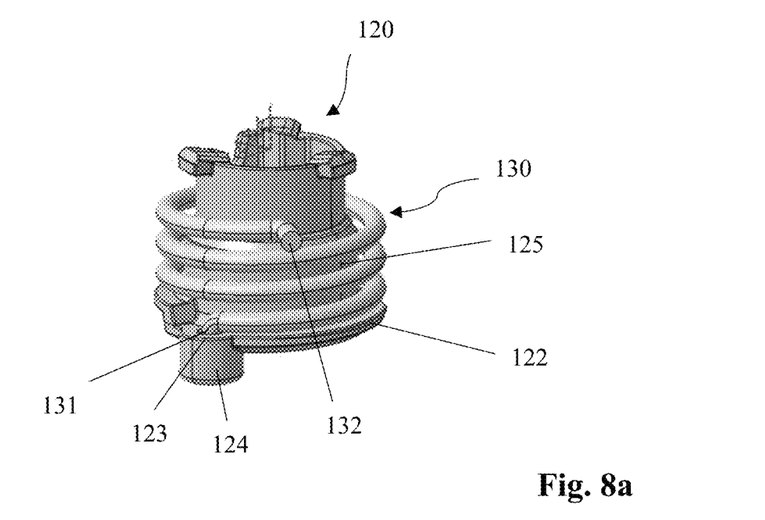
FIGS. 8a and 8b are different perspective views of the bayonet tower with the spring of the pivot joint system of FIG. 4.
Figure 8B:
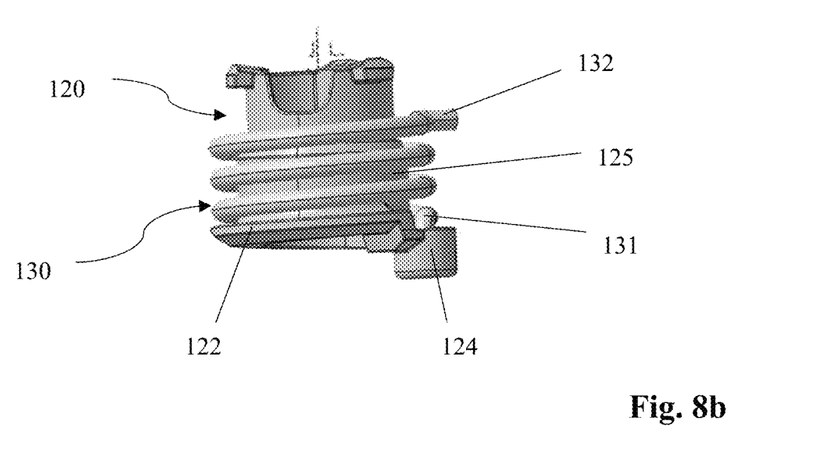

FIG. 7*c* shows the arrangement of the spring 130 within the base frame 110 with one end 132 of the spring 130 being received within a locking receiver 115 of the base frame 110 in order to lock the same. The other end 131 of the spring 130 is locked to the bayonet tower 120 as shown in FIGS. 8*a* and 8*b*. The bayonet tower 120 is provided with a cylindrical section 125 and a locking receiver 124 for the spring end 131, actually been introduced into a recess 123 of the locking receiver 124.

Figure 9:
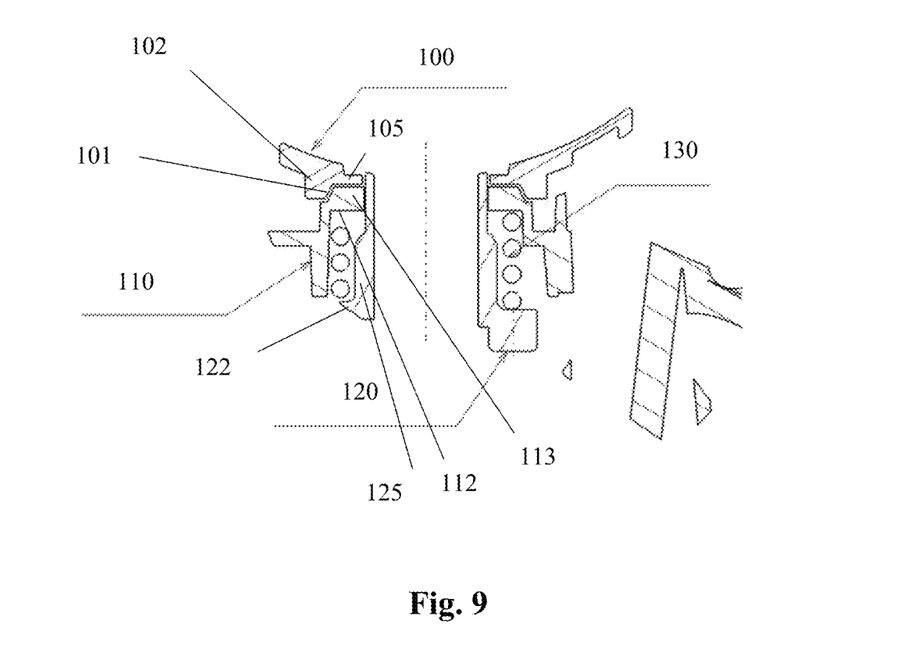
FIG. 9 is a cross section through a part of the assembled pivot joint system of FIG. 4.

In the assembled configuration, the spring 130 is compressed between a rim 122 of the bayonet tower 120 and a rim 112 of the base frame 110, as shown in FIG. 9. The rim 122 is angled to follow the compressed state of the spring 130 maximizing clearance to the cosmetic base covers (not shown). Thus, the spring 130 is arranged around the cylindrical section 125 of the bayonet tower 120 and within the cylindrical section 111 of the base frame 110, with the base frame 110 being attached to the case frame 100 as well as the bayonet tower 120 via a detent system. The detent system comprises the detents 113 of the base frame 110 engaging the detents 102 standing from the cylindrical section 105 of the case frame 100, there between, and the locking projections 121 of the bayonet tower 120 engaging the recesses 114 provided by the detents 113.

The attachment of the spring 130 between the sub assembly composed of the case frame 100 and the bayonet tower 120 on the one hand and the base frame 110 on the other hand allows for a self-return of the case frame 110 after having been knocked out upon an impact of an external force as the spring 130 not only ensures the connection between the bayonet tower 120, the base frame 110 and the case frame 100 by compression forces, but also acts as a torsion spring.

Applying a force to the case frame 100 leads to lifting and rotating the same. This results in compressing the spring 130 due to lifting also the bayonet tower 120 with its rim 122. In addition, said force applied to the spring 130 results in a torsion of the spring. The compression and torsion energy stored within the spring 130 results in forcing the case frame 100 back in its original position as soon as said force is no longer applied thereto.

Thus, the pivot joint system of the invention makes usage of a spring mechanism created to provide torsional and compressive forces to automatically return the head 60' from the knocked out position to the drive condition following a rotational impact.

Although modifications and changes may be suggested by those skilled in the art, it is the intention of the application to embody within the patent warranted here on all changes and modifications as reasonably and probably come within the scope of this contribution to the art. The features of the present invention which are believed to be novel are set forth in detail in the appended claims. The features disclosed in the description, the figures as well as the claims could be essential alone or in every combination for the realization of the invention in its different embodiments.

REFERENCE SIGNS 10 case frame
10a step
10b cylindrical section
11 base frame
11a cylindrical section
12 spacer
13 torsion spring
14a first locking means
14b second locking means
15 pivot axis
20 case frame
20a step
20b cylindrical section
20c shoulder
20d cylindrical extension
20e recess
21 base frame
21a shoulder
21b cylindrical section
22 bolt
22a support extension
23 torsion spring
24 detent means
24a first detent
24b second detent
24c guide ramp
24d stop
24e top
25 pivot axis
26 nut
27 washer
28 axis
50 base
60 head in driving position
60' head in knocked out position
100 case frame
101 step
102 detent
102a lip
103 stop element
105 cylindrical section
110 base frame
111 cylindrical section
112 rim
113 detent
114 recess
115 locking receiver
120 bayonet tower
121 locking projection
122 rim
123 recess
124 locking receiver
125 cylindrical section
130 torsion spring
131 first end
132 second end

What is claimed is:

1. A pivot joint system of a rear view device, comprising:
a base to be fixed to a vehicle;
a head rotatable relative to the base;
two components that rotate with respect to one another around an axis to control rotation of the pivot joint system from a first set position to at least one second set position, each of said two components comprising a cylindrical section and a resilient means being arranged within a cylindrical space between the cylindrical sections to act between said two components, the first component being part of or fixedly connected to the head, the second component being part of or fixedly connected to the base, and the resilient means comprising a torsion spring arranged concentrically around the pivot axis,
a detent means for securing the first set position of the first component relative to the second component until a predetermined torsional load is applied rotating the first component relative the second component; and
a bolt that has a longitudinal axis falling together with the pivot axis, the bolt providing a support extension for a first end of the spring, and a second end of the spring abuts against a shoulder of the second component cylindrical section,
wherein the torsion spring has a first tail at a first end which is attached to the first component, and a second tail at the second end which is attached to the second component so that a torsional load applied onto the spring when rotating the first component out of the first set position relative to the second component into the at least one second set position relative to the second component forces the first component back into the first set position relative to the second component with the first set position being defined by a driving position of the head and the at least one second set position comprising a knocked out position of the head,
wherein the detent means lifts the first component relative to the second component when rotating in the at least one second set position resulting in a compression of the spring so that relaxation of the spring assists in forcing the first component back into the first set position relative to the second component, and
wherein at least one of
the first component cylindrical section is provided with a step against which the second component cylindrical section is forced by the spring, or
the pivot joint system further comprises a washer that is arranged between the support extension and the spring as well as the first component cylindrical section with the first component cylindrical section being concentrically arranged around the bolt, the spring being concentrically arranged around the first component cylindrical section, and the second component cylindrical section being concentrically arranged around the spring.

2. The pivot joint system of claim 1, wherein at least one of
a spacer is arranged concentrically around the first component cylindrical section below the spring, or
the second component cylindrical section has its longitudinal axis shifted relative to the pivot axis.

3. The pivot joint system of claim 1, wherein the first component comprises a case frame and a bayonet means comprising a bayonet tower.

4. The pivot joint system of claim 3, wherein one or more detents of the case frame, extending from the cylindrical section of the case frame or being part of the detent means, are arranged concentrically at least one of around a cylindrical section of the bayonet means or concentrically within the cylindrical section of the case frame at least one of between detents of the detent means of the case frame or above the spring.

5. The pivot joint system of claim 3, wherein a recess is provided in each of one or more detents of the detent means of a base frame for engaging with a locking projection of detent means of the bayonet means projecting from the cylindrical section of the bayonet tower.

6. The pivot joint system of claim 3, wherein the spring is adapted to be compressed between an extension or rim of the bayonet means and a shoulder or rim of a base frame provided by detent means of the base frame.

7. The pivot joint system of claim 1, wherein the tails of the spring are attached via locking means to the first component cylindrical section and the second component cylindrical section, respectively.

8. The pivot joint system of claim 7, further comprising a spacer arranged concentrically around the first component cylindrical section below the spring, wherein at least one of
- the locking means is rotationally displaced relative to each other,
- the first locking means extends between the first component cylindrical section and the spacer and the second locking means extends between the spacer and the second component cylindrical section, or
- the first locking means ensures a locking of the first tail of the spring internal into the first component cylindrical section and the second locking means ensures a locking of the second tail of the spring external to the second component cylindrical section.

9. The pivot joint system of claim 1, wherein the washer is attached to at least one of the first component cylindrical section or the first end of the spring.

10. The pivot joint system of claim 1, wherein the detent means extends into a recess of the first component cylindrical section with the recess being defined within a cylindrical extension of the first component cylindrical section.

11. The pivot joint system of claim 1, wherein the detent means comprises at least one of:
- at least one detent acting on an inner surface of a cylindrical extension;
- a guide face in form of a flat or inclined guide ramp along which a cylindrical extension of a case frame that can travel during rotation of the first component relative to the second component, the recess having a shape complementary to the guide ramp;
- at least one further detent forming a stop against which the cylindrical extension is abutting to define a second set position, or
- a top provided by the stop to abut against the recess.

12. The pivot joint system of claim 1, wherein at least two head movement stops are provided by a case frame between two detents of the detent means.

13. The pivot joint system of claim 1, further comprising sealing means comprising at least one seal element between a case frame and a base frame and clipped to a case frame.

14. A rear view device, comprising:
- the base to be fixed to a vehicle;
- the head rotatable relative to the base; and
- the pivot joint system according to claim 1,
- wherein the first component is part of or fixedly connected to the head in form of a case frame or a part fixedly connected to a case frame like a bayonet tower,
- wherein the second component is part of or fixedly connected to the base in form of a base frame,
- wherein the first set position is defined by the driving position of the head, and
- wherein the second set position comprises the knocked out position of the head.

15. The rear view device of claim 14, wherein the head comprises one or more of at least one reflective element and a camera which is attached to the case frame via an articulation system.

16. The rear view device of claim 15, wherein each detent of the detent means of the case frame is provided with a lip at least along a part of its outer perimeter for a smooth interface with a motor cradle of the articulation system.

* * * * *